(12) United States Patent
Moshfeghi et al.

(10) Patent No.: US 9,313,733 B2
(45) Date of Patent: Apr. 12, 2016

(54) REPEATER DEVICE FOR REDUCING THE ELECTROMAGNETIC RADIATION TRANSMITTED FROM CELLULAR PHONE ANTENNAS AND EXTENDING PHONE BATTERY LIFE

(75) Inventors: Sina Moshfeghi, Rancho Palos Verdes, CA (US); Mehran Moshfeghi, Rancho Palos Verdes, CA (US)

(73) Assignee: GOLBA LLC, Rancho Palos Verdes, CA (US)

( * ) Notice: Subject to any disclaimer, the term of this patent is extended or adjusted under 35 U.S.C. 154(b) by 543 days.

(21) Appl. No.: 13/564,154

(22) Filed: Aug. 1, 2012

(65) Prior Publication Data

US 2013/0035090 A1 Feb. 7, 2013

Related U.S. Application Data

(60) Provisional application No. 61/514,878, filed on Aug. 3, 2011.

(51) Int. Cl.
| | | |
|---|---|---|
| *H04W 88/04* | (2009.01) | |
| *H04W 52/02* | (2009.01) | |
| *H04W 52/28* | (2009.01) | |
| *H04W 52/46* | (2009.01) | |
| *H04B 7/155* | (2006.01) | |

(52) U.S. Cl.
CPC ....... *H04W 52/0206* (2013.01); *H04B 7/15528* (2013.01); *H04W 52/288* (2013.01); *H04W 52/46* (2013.01); *H04W 88/04* (2013.01); *H04W 52/0203* (2013.01); *Y02B 60/50* (2013.01)

(58) Field of Classification Search
CPC ............ H04W 88/04; H04W 52/0203; H04W 52/0206; H04W 88/08
USPC ...................................... 455/422.1, 11.1, 571
See application file for complete search history.

(56) References Cited

U.S. PATENT DOCUMENTS

| | | | | |
|---|---|---|---|---|
| 6,473,600 | B1 * | 10/2002 | Dvorkin ......................... | 455/129 |
| 7,280,799 | B1 * | 10/2007 | Najafi et al. .................. | 455/11.1 |
| 7,409,235 | B2 * | 8/2008 | Cordella et al. ............ | 455/569.2 |
| 2004/0146013 | A1 * | 7/2004 | Song et al. ..................... | 370/279 |
| 2010/0136966 | A1 * | 6/2010 | Pergal ......................... | 455/422.1 |
| 2011/0269397 | A1 * | 11/2011 | Bella et al. ................... | 455/11.1 |
| 2011/0298559 | A1 * | 12/2011 | Kitching et al. .............. | 333/103 |
| 2012/0235636 | A1 * | 9/2012 | Partovi ........................... | 320/108 |

* cited by examiner

*Primary Examiner* — Asghar Bilgrami
(74) *Attorney, Agent, or Firm* — ADELI LLP

(57) ABSTRACT

A cellular communication system and method is described where a low-cost repeater is used to reduce the transmit power of a cell phone. The cell phone transmits a low-power modulated carrier signal to a nearby repeater. The repeater amplifies the signal and transmits it to a cellular base-station. The reduction of cell phone transmit power lowers the exposure of humans to RF radiation and increases the battery life of the cell phone.

48 Claims, 11 Drawing Sheets

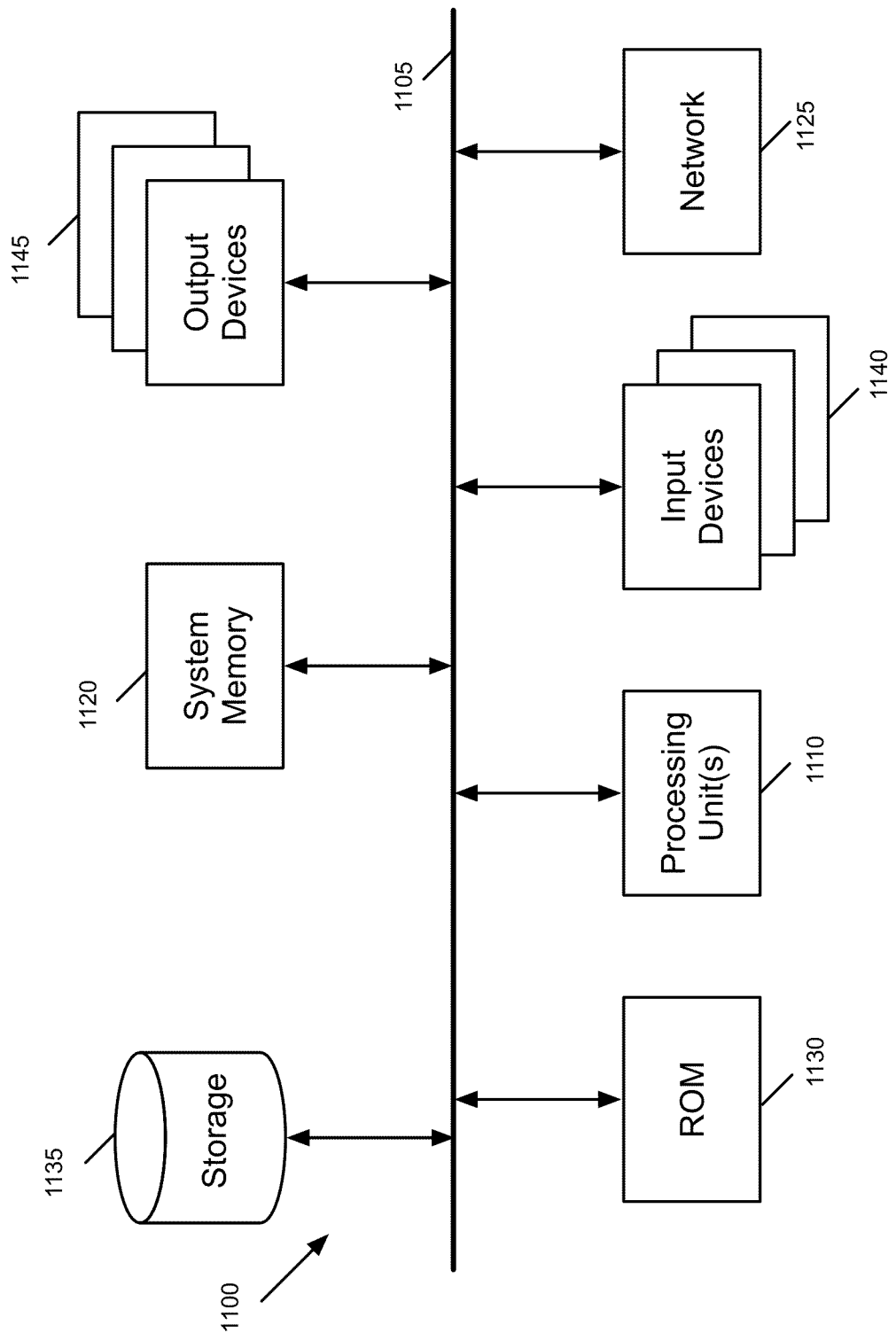

REPEATER DEVICE FOR REDUCING THE ELECTROMAGNETIC RADIATION TRANSMITTED FROM CELLULAR PHONE ANTENNAS AND EXTENDING PHONE BATTERY LIFE

CLAIM OF BENEFIT TO PRIOR APPLICATIONS

The present application claims the benefit of U.S. Provisional Patent Application 61/514,878, entitled, "Repeater Device for Reducing the Electromagnetic Radiation Transmitted From Cellular Phone Antennas and Extending Phone Battery Life," filed Aug. 3, 2011. The contents of U.S. Provisional application 61/514,878 are hereby incorporated by reference.

BACKGROUND

Portable communication devices such as cell phones are becoming increasingly pervasive as their costs have come down and their functionalities have increased. Throughout this description the terms "cell phone", "cellular phone", "mobile phone", "smart phone" and "wireless phone" are used interchangeably. Such devices provide mobile users with the convenience of having voice and data communication from most locations using a number of standards such as CDMA, TDMA, cellular second generation (2G), cellular third generation (3G), and cellular fourth generation (4G). Many phones also support other wireless standards such as WLAN 802.11*, Bluetooth®, Worldwide Interoperability for Microwave Access (WiMAX), 60 GHz, HD Radio™ and Ultra-WideBand (UWB). Phone users with data plans can use their cell phone to send and receive email, text messages, check their calendar, browse the Internet, upload and download content, and store contact information and other data. Cell phones also receive and send control data from and to base-stations, such as broadcast base-station beacon messages and unicast base-station data. Most phones are now equipped with still image and video cameras and take pictures and videos. High-end cell phones are also computing devices that download and run dedicated applications.

Cellular networks typically divide a coverage area into a series of cells. Each cell has a cell tower base-station that includes a transmitter, receiver, and antenna. The transmit power of the base-station determines the area of the cell; the larger the transmit power the larger the size of the cell. FIG. 1 illustrates a conventional cellular communication system according to prior art. As shown in the figure, cellular phone users 105 typically place the phone 110 next to their ear and their mouth near the microphone. When the user is making a voice call and is talking, the cell phone uses its antenna to transmit high frequency RF waves to one or more cell base-stations 115. The base-stations have base-station controllers and are connected to telephone networks that include operation centers, mobile services switching centers, and public switched telephone networks (as well as data networks such as the Internet). These components and networks route the voice call to the phone of the intended receiver. When receiving a voice call, the antenna of the cell phone receives radio frequency (RF) waves transmitted from the closest cell base-station. Cellular communication systems typically use a slightly different receive frequency, f2, versus transmit frequency f1, to avoid interference.

Several studies have been carried out to investigate the effect of cell phone radiation on the human body. A recent study and review in 2010 by the World Health Organization (WHO) categorized mobile phone use in the same carcinogenic hazard category as lead, engine exhaust and chloroform. An article by Danielle Dellorto, titled "WHO: Cell phone use can increase possible cancer risk," published by CNN on May 31, 2011 discussed the results of the study. This article can be found on the Internet. The study concludes that in addition to causing brain cancer and tumors there could be other effects like cognitive memory function.

The RF radiation emitted from cell phones is similar to a low-powered microwave. The increased use of cellular phones for voice calls exposes humans to more potentially harmful RF radiation. Cell phones emit the most radiation when they are attempting to connect to cell base-stations because distances to the nearest base-station can be as high as 1-2 miles. A moving cell phone, or a cell phone in an area with a weak signal, has to transmit even more power and radiation. Several cell phone manufacturers recommend keeping the phones 15-25 mm away from the body when the phone is transmitting since the radiation decreases exponentially with distance. The pervasive use of cellular phones for voice calls, data transfer, and other functions also reduces their battery life.

Several attempts have been made to reduce the exposure of humans to RF radiation. One approach is to shield the body from the antenna radiation by placing a conductive strip between the transmitting antenna and the head of the user. Another approach is to move the RF radiation away from the body by changing the antenna location and radiation pattern. Another approach is to cancel the radiation pattern with an absorbent directional shield. Others have replaced wired or RF wireless headsets with an optical ear piece that connects the phone to the ear and shields the RF radiation, which is directed towards the user.

Wired and wireless headsets are another approach, where the cell phone is kept away from the human body. Here the user wears a headset that has an earpiece and a microphone, and the cell phone communicate with a headset using a wire or a short-range wireless protocol (e.g., Bluetooth®, 802.11*). There are however conflicting reports that indicate in some instances the headset acts as an antenna that focuses the radiation to the head and brain of the user. Also, unlike cell phones that are placed near the head only when they are in use, people who use headsets usually keep the headset on even when there are no voice calls and are therefore exposed to background signals such as the repeating beacon signals that are transmitted between a wireless headset and the cell phone. Furthermore, many people do not like using a headset and use the cell phone by placing it next to their ear and mouth.

Cellular repeaters are another approach. Repeaters are typically used to extend the coverage of cellular radio networks in difficult areas such as tunnels, and mountainous terrain. Indoor coverage of cellular networks in homes, shopping malls and small businesses are also improved with the use of smaller cellular base-stations called femtocells or microcells. Although these repeaters are bi-directional their primary design consideration is to boost the downlink signals from cellular base-stations to mobile devices. These repeaters are complex and expensive devices because they perform modulation/demodulation and other tasks. Although the cost of these devices is lower than installing cellular base-stations they are too expensive for widespread consumer use. They are also too bulky to be mobile and carried around by consumers.

BRIEF SUMMARY

Some embodiments provide a method and system where a low-cost light-weight repeater lowers the transmission power of a mobile device and extends the range of the up-link signals from the mobile device to base-stations. The reduction in transmit power lowers the exposure of humans to RF radiation and increases the battery life of the cell phone.

Some embodiments provide a cellular communication system and method where a cell phone's cellular radio transmits a low-power modulated carrier signal to a nearby repeater and the repeater amplifies the signal and transmits the resulting high-power signal to a distant cellular base-station. This lowers the exposure of humans to RF radiation and increases the battery life of the cell phone. In some embodiments the battery of the communication system is distributed and its life is a combination of the life of the phone battery and the repeater's battery.

In some embodiments, the repeater is a one-way repeater that includes primarily a power amplifier, a power source, a receive antenna, and a transmit antenna. The repeater has a power on/off switch in some embodiments. The power switch is either operated manually or it is operated with a control signal that is sent from the cell phone where the cell phone acts as the master and the repeater acts as the slave. For instance, the repeater's power switch in some embodiments has a power-control RFID or NFC tag. The cell phone uses its RFID/NFC reader to interrogate the tag when it is about to transmit. The tag then generates a signal for the power switch that transitions the repeater from a sleep state to an on state. Likewise, after the cell phone has finished its transmission it sends a control signal that sends the repeater to a sleep or power off state. Such manual or automatic power switching is important for extending the battery life of mobile repeaters. The repeater in some embodiments does not perform down-conversion or up-conversion on the receive signal.

The repeater in some embodiments is integrated in another mobile electronic device that the user carries such as a digital watch, digital tablet, laptop, portable handheld computer, game controller, digital camera, digital audio player, pager, laptop computer, personal digital assistant (PDA), etc. In some embodiments, the repeater is placed at a public place for general use and/or integrated into a fixed location electronic device such as a wireless access point, router, television, cable and satellite set-top box, PC, display monitor, stereo system, fax, printer, scanner, hard disk, flash drive, and other consumer electronic devices.

The repeater device in some embodiments is attached to the user by an adjustable clip or is placed near him/her at home, at the office, or at public places. For instance, the repeater can be in a pocket, purse, attached to a belt/key-chain, or worn on a wrist/ankle. An adjustable clip is used to ensure there is at least a minimum recommended distance between the repeater and the person's body in some embodiments. The repeater in some embodiments has an alternating current (AC) power input for connecting it to AC power outlet and a charging slot for charging the repeater's battery.

The cellular phone receives voice calls and data directly from the cellular base-station, without using the repeater in some embodiments. The cell phone changes its mode of operation from directly transmitting to the base-station to using the repeater when the cell phone battery power level reaches below a pre-set threshold. The cell phone also acts as the master of the repeater for turning its power on and off as needed. In some embodiments, the repeater is bi-directional and operates in both the uplink and downlink directions. In these embodiments, the repeater is used for transmission and/or reception of voice and/or data.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed. Moreover, the claimed subject matters are not to be limited by the illustrative details in the Summary, Detailed Description and the Drawing, but rather are to be defined by the appended claims, because the claimed subject matters can be embodied in other specific forms without departing from the spirit of the subject matters.

BRIEF DESCRIPTION OF THE DRAWINGS

The novel features of the invention are set forth in the appended claims. However, for purpose of explanation, several embodiments of the invention are set forth in the following figures.

FIG. 11 conceptually illustrates an electronic system with which some embodiments of the invention are implemented.

DETAILED DESCRIPTION

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

The examples illustrated throughout this Specification use a cellular Radio Frequency (RF) communication system to demonstrate the invention. However, the architecture is general and applies to other wireless communication systems. Transmit and receive power of wireless communication systems is expressed in dBm (or dBmW). One dBm is the power ratio in decibels (dB) of the power with reference to one milliwatt (mW). Thus, a power P can be expressed as x dBm, where x=10 log$_{10}$(1000P). This is an absolute power measurement unit, in contrast to the dimensionless decibel unit that quantifies the ratio between two values. Zero dBm equals one milliwatt. Doubling the power is approximately a 3 dB increase, which means that 3 dBm corresponds to about 2 mW. Reducing the power by half is approximately a 3 dB decrease, which means −3 dBm corresponds to about 0.5 mW.

The RF radiation a cell phone receives from a base-station is orders of magnitude smaller than the transmit radiation the cell phone emits to the base-station. This is because RF radiation decreases exponentially with distance. For a cellular communication system the receive power by the antenna is about −110 dBm. In contrast, the transmit power of the antenna is typically 33 dBm because it has to compensate for attenuation of the RF as it travels from the cell phone to the cellular base-station. Accordingly, some embodiments of the invention focus on reducing the much higher transmit radiation of a cellular phone.

I. Use of a Repeater to Reduce Effects of Cell Phone Radiations

Figure 2:
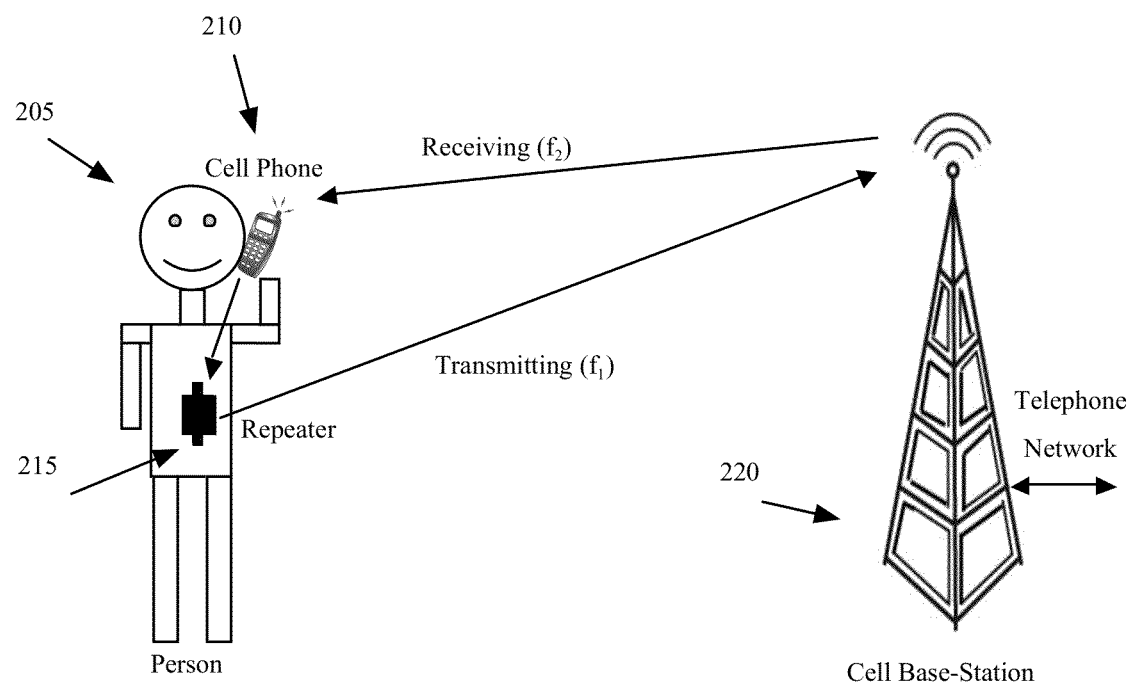
FIG. 2 conceptually illustrates an RF cellular communication system in some embodiments of the invention where the user is carrying a cell phone and is near a one-directional repeater.

FIG. 2 conceptually illustrates an RF cellular communication system in some embodiments of the invention where the user is carrying a cell phone and is near a one-way (unidirectional) repeater. The repeater 215 is either carried by the user 205 or is near the user. The cellular phone 210 receives voice calls and data directly from the cellular base-station 220. On voice and data transmissions, however, the cell phone transmits a low-power signal to the nearby repeater. The repeater 215 then amplifies the signal and transmits it to the base-station 220. The RF transmit power of the repeater is similar to a conventional cellular phone. The advantage, however, is that the repeater is not near the head of the person. The repeater in some embodiments also has an adjustable spacing mechanism (as described by reference to FIG. 7, below) so that if it is attached to a belt or a wristband it is separated from the body.

Figure 3:
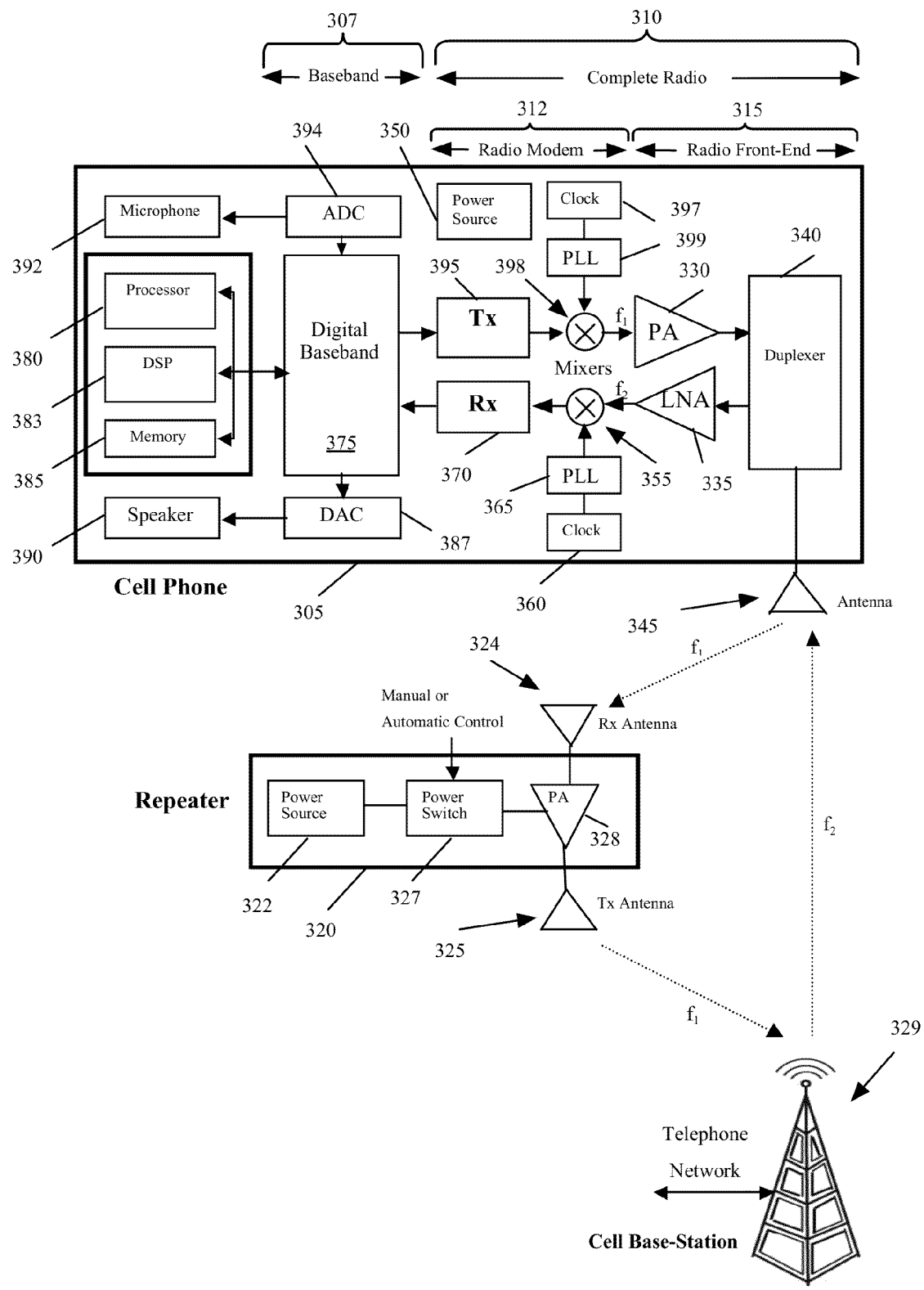
FIG. 3 conceptually illustrates a detailed block diagram of a cell phone and the repeater in some embodiments of the invention.

FIG. 3 conceptually illustrates a block diagram of a cell phone and the repeater in some embodiments of the invention. The repeater and the cell phone are physically separate devices, each having its own encasing, components, substrate, power sources, and antennas. The cell phone supports cellular standards such as CDMA, TDMA, cellular second generation (2G), cellular third generation (3G), and cellular fourth generation (4G). The cell phone also supports other wireless standards such as WLAN 802.11*, Bluetooth®, WiMAX, 60 GHz, HD Radio™ and UWB. One partitioning of the cell phone includes the digital baseband 307 and the complete radio 310, as shown in FIG. 3. The complete radio 310 is further partitioned into the modem 312 and the front-end 315. The modem modulates the analog carrier signal to encode digital information, and demodulates the carrier signal to decode the transmitted information. The front-end 315 includes the Power Amplifier (PA) 330, Low Noise Amplifier (LNA) 335, duplexer 340, and antenna 345. The radio modem and the radio front-end are close together in some embodiments, e.g., as a single integrated circuit chip.

In FIG. 3 the radio system has a power source 350 for all its components. This power source is a rechargeable battery in some embodiments. During cell phone reception the base-station 329 transmits an RF modulated carrier signal of frequency f2 to the cell phone. The size of the cell phone's antenna 345 depends on the frequency f2; the lower the frequency the larger the antenna. The cell phone's antenna 345 receives the signal from the base-station. The duplexer 340 connects the antenna to the LNA 335. The duplexer 340 is needed to support full duplex operations so the cell phone is able to transmit and receive at the same time. The LNA 335 amplifies the received signal and feeds it to a down-converter mixer 355. A clock 360 and a Phase Lock Loop (PLL) synthesizer 365 are used to generate an RF signal with frequency f2. The down-converter mixer 355 down-converts the signal by mixing it with this RF generated f2 signal. The down-converted signal is then fed to a receiver (Rx) 370 which performs analog gain control and filtering before feeding the signal to its Analog to Digital Convertor (ADC) for digital conversion. The digital baseband 375, processor 380, DSP 383, and memory 385 process the digital signal output of the ADC. The processed signal is sent to a Digital to Analog Converter (DAC) 387 and the resulting analog signal is fed to the phone's speaker 390.

In FIG. 3 during transmission the user speaks into the microphone 392 of the cell phone. The analog voice signal is digitized with an ADC 394 and fed to the baseband. The baseband, processor 380, DSP 383, and memory 385 process the digital signal, generate symbols, and perform digital modulation. The baseband modulated signal is fed to a transmitter (Tx) 395. The transmitter includes a DAC (not shown) for analog conversion of the signal, and a gain control component (not shown) that changes the gain of its amplifier based on signals received from the base-station. The transmitter also performs filtering before feeding the signal into an up-converter mixer 398. A clock 397 and a PLL synthesizer 399 are used to generate an RF transmit carrier, which is mixed with the transmitter's signal to generate a modulated RF carrier signal of frequency f1. This signal is amplified by a PA 330 and fed to a frequency or time duplexer 340. The duplexer connects the PA's output signal to the antenna 345 during transmission so that the antenna radiates the modulated RF signal over the airwaves to a receiver or a set of receivers. If the signal in the receive path is strong then processor 380 lowers the gain of transmitter Tx 395 or PA 330. Likewise, if the signal in the receive path is not strong then processor 380 increases the gain of transmitter Tx 395 or PA 330.

In some embodiments, the cell phone transmits a low-power modulated signal to the repeater 320. FIG. 3 shows that the repeater has its own power source 322, such as a rechargeable battery for mobile repeaters, or AC power for repeaters that are fixed in location and/or are integrated into other AC powered electronic devices. The repeater in FIG. 3 operates in one direction and has two antennas; a receive (Rx) antenna 324 and a transmit (Tx) antenna 325. The receive antenna receives the low-power modulated carrier signal from the cell phone. The repeater does not perform any down-conversion or up-conversion on the receive signal so the frequency of the received carrier signal does not change. The repeater simply feeds the signal to its amplifier 328, which amplifies the signal with a fixed gain. The amplifier is linear and in some embodiments is a two-stage amplifier. The repeater then uses it's transmit antenna 325 to transmit to the base-station and the telephone network. The repeater's transmit and receive antennas are isolated to avoid loop oscillation. Isolation can be achieved with antenna design isolation techniques such as optimal angle and separation between the two antennas, insertion of shielding and attenuation materials between the two antennas, and the use of directional antennas.

The repeater in some embodiments also has a power on/off switch 327. The switch is either a manual switch that requires user operation, or it is operated with a control signal that is sent from the cell phone where the cell phone is the master and the repeater is the slave. For instance, the repeater's power switch 327 in some embodiments has a power-control Radio-Frequency IDentification (RFID) or Near-Field Communication (NFC) tag. The repeater in some embodiments also has simple logic circuits that control the power switch. Prior to the cell phone transmitting, the cell phone in some embodiments uses its RFID/NFC reader (not shown in the figure) to interrogate and activate a nearby passive tag. In some embodiments, the RFID/NFC reader transmits a Radio Frequency (RF) signal which has an RF field, and a passive tag uses the energy of the RF field as its energy source for activation. The tag then generates a signal for the power switch which transitions the repeater from a sleep state to an on state. Likewise, after the cell phone has finished its transmission, the cell phone in some embodiments sends a different control signal that the repeater's logic circuits use to send the repeater to a sleep or off state. Such manual or automatic power switching is important for extending the battery life of mobile repeaters. In some embodiments the cellular phone has the ability to send signals to a second device to turn its power on or off. FIG. 3 is a special case where the second device is a repeater.

In a conventional cell phone the antenna typically transmits 33 dBm to the cellular base-station. In some embodiments the cell phone's antenna transmits about 0 dBm to the repeater's receive antenna, which receives about −10 dBm since the radiation decreases exponentially as it travels from the cell phone to the repeater. The repeater's linear PA 328 then amplifies the signal so the repeater's transmit antenna transmits 33 dBm to the base-station. Thus, instead of the PA/antenna of the cell phone operating at 33 dBm they operate at 0 dBm. If there is attenuation loss between the PA 328 and the antenna of the repeater it can be measured and the PA amplification of the repeater can compensate for it. For example, the PA can operate at 35 dBm to compensate for a 2 dBm PA-to-antenna loss, resulting in a 33 dBm signal transmitted from the antenna. The range of these cellular signals depends on the transmit power and path loss as the RF wave travels through space. Path loss depends on the distance travelled, as well as other factors such as the terrain and obstructions (building, trees, etc.). Cell tower base-stations are usually grouped in areas of high population density. Cell phone traffic through a single base station tower is limited by the number of calls or amount of data that a base station can handle at once. This limitation is another factor affecting the spacing of cellular base station sites. In suburban areas, cellular base stations are typically spaced 1-2 miles (2-3 km) apart and in dense urban areas, base stations may be as close as ¼-½ mile (400-800 m) apart. One of the factors that limit range is the ability of a low-powered cellular phone to transmit back to the base station. It is possible to get a range of 50 to 70 km (30-45 miles) to a tall cellular base-station tower in a flat environment. When the environment is hilly, however, the maximum distance can vary from as little as 5 kilometers (3.1 miles) to 8 kilometers (5.0 miles).

The base-station 329 receives the amplified signals, transmits gain control signals to the cell phone, and the cell phone uses them to change its PA gain accordingly. For example, if the base-station is receiving too much power the cell phone lowers its PA gain. Likewise, if the base-station receives a weak signal the cell phone increases its gain. If the cell phone is too distant from the repeater its signal will not reach the repeater and hence the base-station. As a result, the cell phone will not receive a signal back from the base-station and will revert back to the conventional communication mode of FIG. 1. Thus, the gain control functionality is performed in the cell phone with the repeater gain being fixed. It should be noted that the dBm numbers quoted here are examples to illustrate the principal and can vary in different systems and implementations. The general principal, however, is that by shifting the high-power transmission from the cell phone to the repeater the radiation to the head of the user is reduced. The repeater's transmit antenna is far from the head and with the use of a spacer it is also separated from the body. Even a separation of 1 inch results in significant reduction in RF radiation because of the exponential fall-off with distance.

In the embodiments shown in FIG. 3, the cell phone has a low-power cellular voice or data transmission to the repeater, and the repeater makes the high power transmission to the base-station. This reduces the power usage of the cell phone's battery for cellular transmissions, thereby increasing its battery life. Instead, the power usage for voice transmission is shifted to the repeater. In one embodiment all transmissions from the cellular phone go to the repeater and from the repeater to the base station, as in FIG. 2. The processor 380, however, distinguishes between voice and data in some embodiments. In some embodiments, the processor decides from the start whether a transmission goes through the repeater (as in FIG. 2), or not (as in FIG. 1). The decision to use the repeater is based on a number of factors in different embodiments. One such factor is the type of the transmission (e.g., voice or data), where for instance voice transmissions go through the repeater but data transmission go directly to the base stations without using the repeater. In some embodiment the processor uses Quality of Service (QoS) requirements to determine whether the transmissions use the repeater or not. In yet other embodiments the processor checks the battery level of the mobile and uses that to decide between the transmission modes of FIG. 1 and FIG. 2. The cell phone's battery is still used for low-power transmissions, reception and other wireless and computing tasks such as GPS, Wi-Fi, Bluetooth®, WiMax, etc. The user would typically charge both the cell phone and the repeater in their car, office, or at home when needed. Thus, the battery of the communication system is distributed and its life is a combination of the life of the phone's battery and the repeater's battery. In some embodiments, the cell phone requests the battery level of the repeater, and the repeater responds to the request. The cell phone also checks its own battery level. The cell phone then uses its knowledge of both battery levels to decide between the transmission modes of FIG. 1 and FIG. 2. For example if the battery level of the repeater is too low to support a high power transmission to the base station then the cell phone transmits directly to the base station. If the repeater is AC powered some or all of the time then the battery life of the communication system is increased even further.

Figure 4:
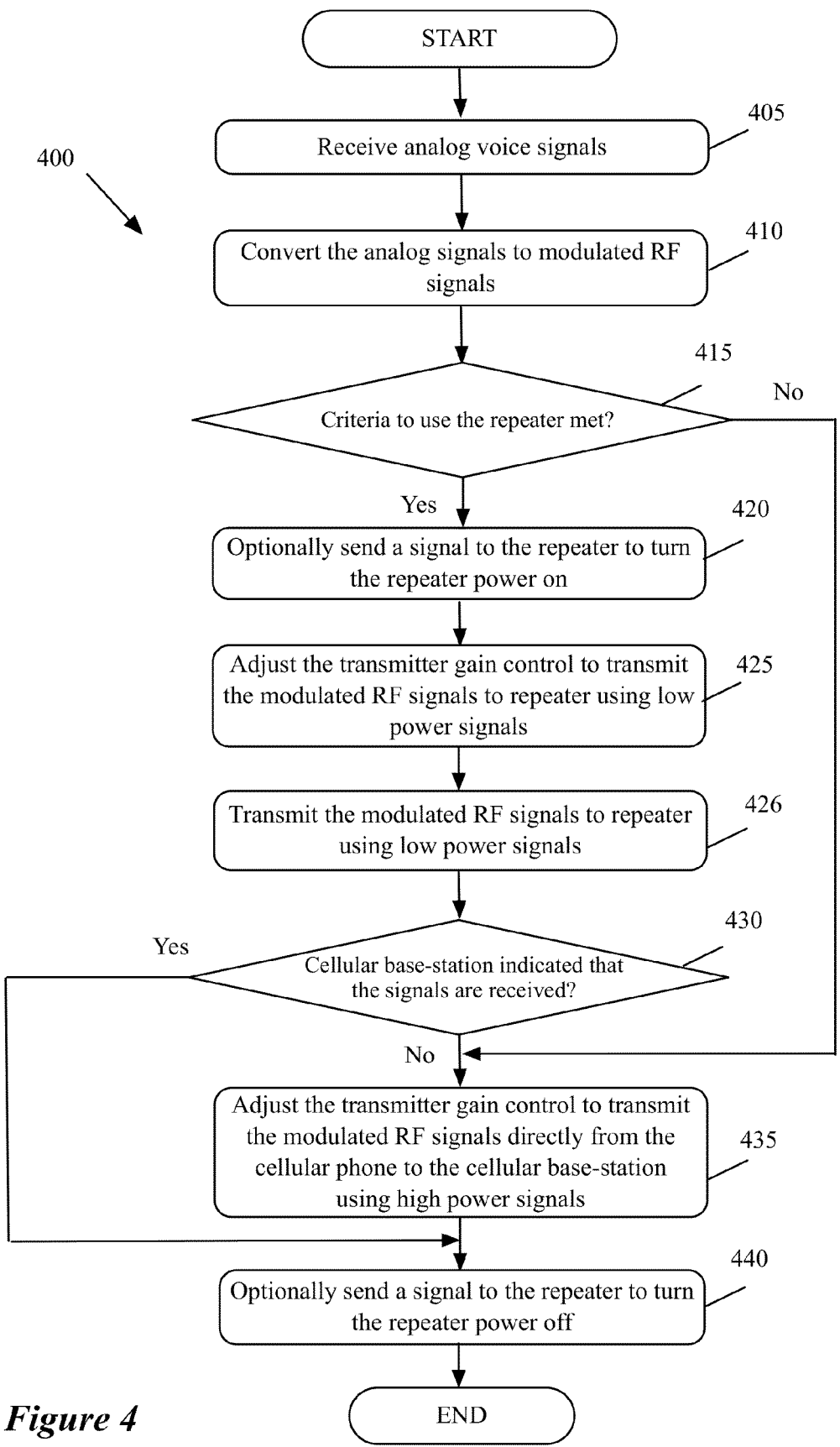
FIG. 4 conceptually illustrates a process for reducing transmission power of a cellular phone by using a repeater to transmit signals to cellular base-stations in some embodiments of the invention.

FIG. 4 conceptually illustrates a process 400 for reducing transmission power of a cellular phone by using a repeater to transmit signals to cellular base-stations in some embodiments of the invention. As shown, the process receives (at 405) signals (e.g., receives analog voice signals when the cell phone user speaks during a call). The process then converts (at 410) the received signals to modulated RF signals.

Next, the process determines (at 415) whether one or more criteria for using the repeater have been met. For instance, in some embodiments the user is provided with a graphical or textual user interface with the options to select a set of criteria to use the repeater. As an example, if the cellular phone can determine the current location of the user with a positioning method such as GPS or other wireless-based methods, the user can set an option to always use the repeater at certain locations (e.g., at home, office, etc.). In some embodiments the user sets an option to always use a repeater on certain dates and/or certain times of the day. In some embodiments there are multiple repeaters each with identification (ID) and the cellular phone maintains a list of authorized repeaters with their IDs and only uses a repeater after exchanging messages with the repeater and checking that the repeater is an authorized repeater. In some embodiments, the user can set an option to always use a repeater if the repeater is available. In some embodiments, the user is provided with the option to set a battery threshold (e.g., a certain percentage of maximum battery level) for the cellular phone battery level, below which the repeater is used. In some embodiments, the user is provided with the option to set a battery threshold (e.g., a certain percentage of maximum battery level) for the repeater battery level, above which the repeater is used. In some embodiments, the user is provided with the option to set a set of criteria based on the battery levels of both the cellular phone and the repeater in order to extend the combined battery lives of the cellular phone and the repeater. In some embodiments, a set of defaults is used to determine whether the cellular phone should use the repeater to transmit signals to the cellular base-stations (e.g., use repeater for both voice and data, use repeater for voice but not for data, or use repeater for high QoS requirements, etc.).

When the process determines (415) that the criteria to use the repeater is not met, the process proceeds to 435 which is described below. Otherwise, the process optionally sends (at 420) a signal to the repeater to turn the repeater power on. The process then adjusts (at 425) the transmitter gain control (if not already done) to transmit the modulated RF signals to the repeater by using low power transmission signals. The process then transmits (at 426) the modulated RF signals to the repeater by using low power transmission signals. As described above, the repeater amplifies the received signals and transmits them to the cellular base station using high power modulated RF signals.

The process then determines (at 430) whether the base-station has received the signals from the repeater. For instance, if the repeater is too far from the cellular phone or has no power, the repeater does receive the signals from the cellular phone and/or does not send the signals to the cellular base-station. As a result, the cell phone does not receive a signal back from the base-station in which case process 400 determines that the base-station has not received the signals.

When the process determines that the base-station has received the signals, the process proceeds to 440 which is described below. Otherwise, the process adjusts the transmitter gain control (if not already done) to transmit (at 435) the modulated RF signals directly from the cellular phone to the cellular base-station using high power signals. The process then optionally sends (at 440) a signal to the repeater to turn the repeater power off (or to put the repeater in hibernation where the power to at least a subset of the repeater components is turned off). For instance, the process optionally turns off the repeater power when the base station does not receive signals from the repeater (i.e., when operation 430 proceeds to 435) or when the base station does receive the signals (i.e., when operation 430 proceeds to operations 440) and the process turns off the repeater power until the next transmission from the cellular phone in order to save repeater battery. The process then exits.

Figure 5:
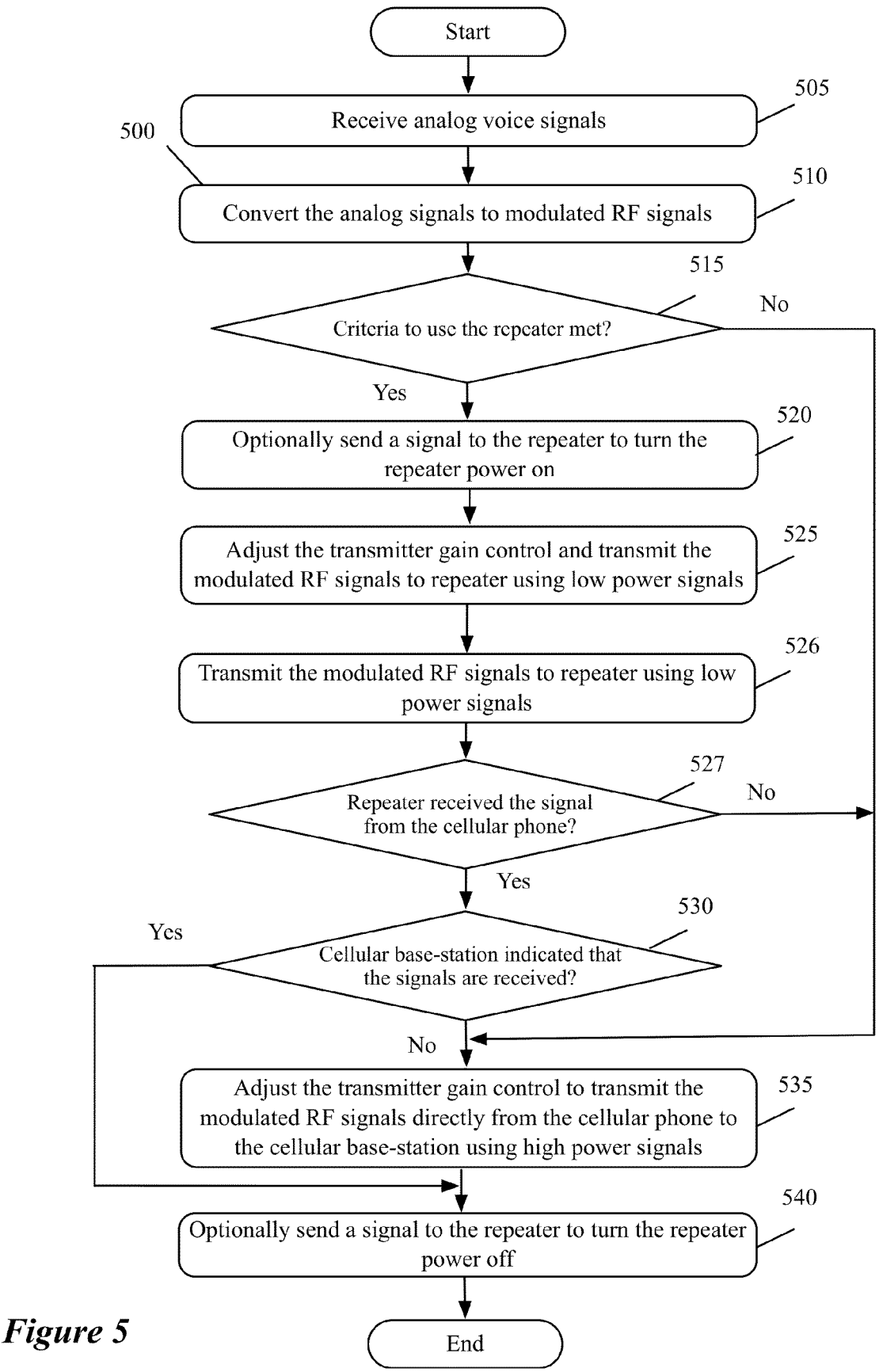
FIG. 5 conceptually illustrates an alternative process for reducing transmission power of a cellular phone by using a repeater to transmit signals to cellular base-stations in some embodiments of the invention.

FIG. 5 conceptually illustrates an alternative process 500 for reducing transmission power of a cellular phone by using a repeater to transmit signals to cellular base-stations in some embodiments of the invention. As described below, process 500 performs a handshake between the cellular phone and the repeater in order to determine whether the repeater has received low power signals from the cellular phone. Operations 505 to 526 are similar to operations 405 to 426 respectively. As shown, the process receives (at 505) signals (e.g., receives analog voice when the cell phone user speaks during a call). The process then converts (at 510) the analog signals to modulated RF signals.

Next, the process determines (at 515) whether one or more criteria for using the repeater have been met as described by reference to operation 415 of process 400, above. When the process determines that the criteria to use the repeater is not met, the process proceeds to 535 which is described below. Otherwise, the process optionally sends (at 520) a signal to the repeater to turn the repeater power on. The process then adjusts (at 525) the transmitter gain control (if not already done) to transmit the modulated RF signals to the repeater by using low power transmission signals. The process then transmits (at 526) the modulated RF signals to the repeater by using low power transmission signals.

The process then determines (at 527) whether the repeater received the signal from the cellular phone. For instance, the cell phone in some embodiments receives an acknowledgement from the repeater that the repeater received the signal to confirm successful communication between the cellular phone and the repeater, in which case the repeater amplifies the received signals and transmits them to the cellular base-station using high power modulated RF signals. If the repeater has received the signal, the process proceeds to 530 which is described below. Otherwise, when the process determines (at 527) that the repeater did not receive the signal from the cellular phone (for instance the repeater is too far from the cellular phone or has no power), the process proceeds to 535 which is described below.

The process determines (at 530) whether the base-station has received the signals from the repeater. When the process determines that the base-station has received the signals, the process proceeds to 540 which is described below. Otherwise, the process adjusts the transmitter gain control (if not already done) to transmit (at 535) the modulated RF signals directly from the cellular phone to the cellular base-station using high power signals. The process then optionally sends (at 540) a signal to the repeater to turn the repeater power off (or to put the repeater in hibernation where the power to at least a subset of the repeater components is turned off). For instance, the process optionally turns off the repeater power when the base station does not receive signals from the repeater (i.e., when operation 530 proceeds to operation 535) or when the base station does receive the signals (i.e., when operation 530 proceeds to operations 540) and the process turns off the repeater power until the next transmission from the cellular phone in order to save repeater battery. The process then exits.

Figure 6:
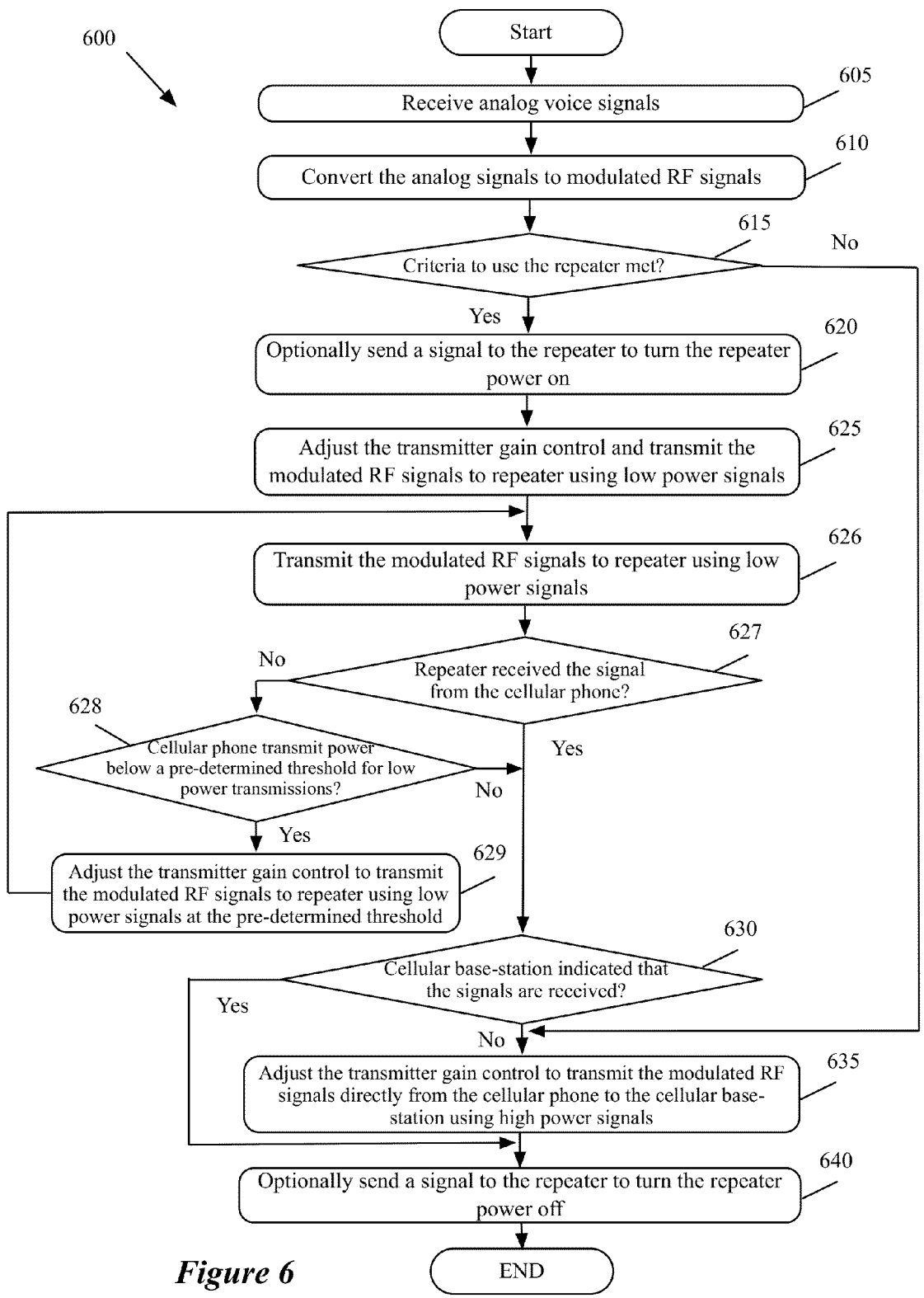
FIG. 6 conceptually illustrates an alternative process for reducing transmission power of a cellular phone by using a repeater to transmit signals to cellular base-stations in some embodiments of the invention.

FIG. 6 conceptually illustrates yet another alternative process 600 for reducing transmission power of a cellular phone by using a repeater to transmit signals to cellular base-stations in some embodiments of the invention. As described below, when the repeater does not receive the low power signals from the cellular phone, process 600 increases the transmit power of the cellular phone in order to establish communication with a repeater that is out of range. The transmit power is increased to a certain threshold. If the repeater is still unavailable, the process adjusts the transmit power to transmit high power long range signals directly to the base station. As an example, if the cellular phone transmits at 0 dBm to the repeater's antenna and the repeater does not receive the signals, the process adjusts the transmit power to transmit at 1 dBm to increase the range of the low power signal. This is still way below the typical 33 dBm that is required to transmit signals directly from the cellular phone to the cellular base station. Once the process increases the transmit power of short-range signals to a certain threshold (e.g., 1 dBm) and the repeater still cannot be reached, the processes switches to using the high power long-range signals (e.g., at 33 dBm) to directly transmit to the cellular base station.

As shown, operations 605 to 626 are similar to operations 405 to 426 respectively. The process receives (at 605) signals (e.g., receives analog voice when the cell phone user speaks during a call). The process then converts (at 610) the analog signals to modulated RF signals.

Next, the process determines (at 615) whether one or more criteria for using the repeater have been met as described by reference to operation 415 of process 400, above. When the process determines that the criteria to use the repeater is not met, the process proceeds to 635 which is described below. Otherwise, the process optionally sends (at 620) a signal to the repeater to turn the repeater power on. The process then adjusts (at 625) the transmitter gain control (if not already done) to transmit the modulated RF signals to the repeater by using low power transmission signals. The process then transmits (at 626) the modulated RF signals to the repeater by using low power transmission signals.

The process then determines (at 627) whether the repeater received the signal from the cellular phone. For instance, the cell phone in some embodiments receives an acknowledgement from the repeater that the repeater received the signal to confirm successful communication between the cellular phone and the repeater, in which case the repeater amplifies the received signals and transmits them to the cellular base-station using high power modulated RF signals. If the repeater has received the signal, the process proceeds to 630 which is described below. Otherwise, when the process determines that the repeater did not receive the signal from the cellular phone (for instance the repeater is too far from the cellular phone), the process determines (at 628) whether the transmit power of the cellular phone is below a threshold for short-range transmission. If not, the process proceeds to 630 which is described below. Otherwise, the process increases (at 629) the transmit power of the cellular phone to the pre-determine threshold. The process then proceeds to 626 to try transmitting to the repeater again.

At 630, the process determines whether the base-station has received the signals from the repeater. When the process determines that the base-station has received the signals, the process proceeds to 640 which is described below. Otherwise, the process adjusts the transmitter gain control (if not already done) to transmit (at 635) the modulated RF signals directly from the cellular phone to the cellular base-station using high power signals. The process then optionally sends (at 640) a signal to the repeater to turn the repeater power off (or to put the repeater in hibernation where the power to at least a subset of the repeater components is turned off). For instance, the process optionally turns off the repeater power when the base station does not receive signals from the repeater (i.e., when operation 630 proceeds to operation 635) or when the base station does receive the signals (i.e., when operation 630 proceeds to operations 640) and the process turns off the repeater power until the next transmission from the cellular phone in order to save repeater battery. The process then exits.

Figure 7:
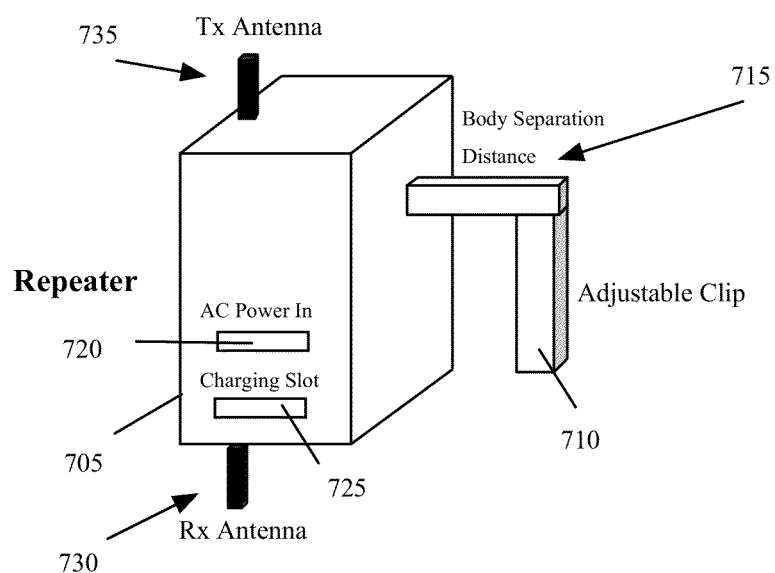
FIG. 7 conceptually illustrates a repeater in some embodiments of the invention.

The repeater is low-cost because it is comprised primarily of a PA, power source and two antennas. FIG. 7 conceptually illustrates a repeater in some embodiments of the invention. The repeater 705 is either attached to the user body or clothing using an adjustable clip 710 or is placed near him/her at home, at the office, or at public places. For instance, the repeater can be in a pocket, purse, attached to a belt/key-chain, or worn on a wrist/ankle. The adjustable clip is used to ensure there is at least a minimum recommended distance 715 between the repeater and the person's body. For example, several cell phone manufacturers recommend keeping the phones 15-25 mm away from the body when the phone is transmitting. The repeater has an AC power input 720 for connecting it to an AC power outlet with a cord when the user is confined to a location such as the home or the office. The repeater also has a charging slot 725 for charging the repeater's battery. The charging slot and AC power input may be physically the same input. The repeater also has a receive antenna 730 and a transmit antenna 735.

Figure 8:
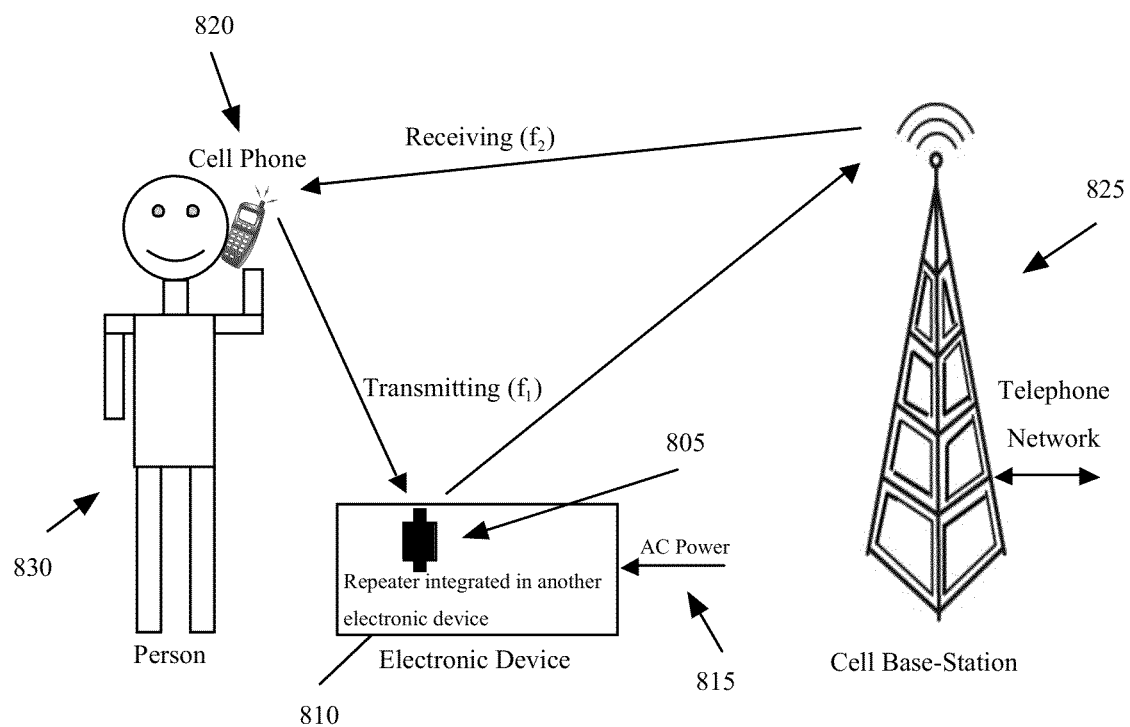
FIG. 8 conceptually illustrates a repeater that is integrated into a fixed location electronic device in some embodiments of the invention.

An increasing number of people use their cell phones at home and at work. The user can place the repeater on a nearby desk or shelf when he/she is in the office or home, and the repeater uses its battery or is plugged into an AC outlet. The repeater in some embodiments is integrated in another mobile electronic device that the user carries such as a digital watch, digital tablet, laptop, portable handheld computer, game controller, digital camera, digital audio player, pager, laptop computer, personal digital assistant (PDA), etc. It is also possible to integrate the repeater into fixed location electronic devices. FIG. 8 conceptually illustrates a repeater that is integrated into a fixed location electronic device in some embodiments of the invention. As shown, a repeater 805 is included in a fixed location device 810. In the example of FIG. 8, the electronic device includes an AC power source 815. The repeater 805 receives transmissions from the cell phone 820 and sends them to the cellular base-station 825. Such electronic devices include wireless access points, routers, televisions, cable and satellite set-top boxes, PCs, display monitors, stereo systems, faxes, printers, scanners, hard disks, flash drives, and other consumer electronic devices. Repeaters in some embodiments are installed at public places for general public use as part of the network infrastructure like cellular and Wi-Fi base-stations. If a user 830 is near two repeaters both repeaters amplify the signals to the base-station, and the base-station has to decode the signals and handle them in a similar manner as multipath signals. Likewise, if two users are near a repeater the repeater amplifies the transmissions from both users to the base-station.

Figure 9:
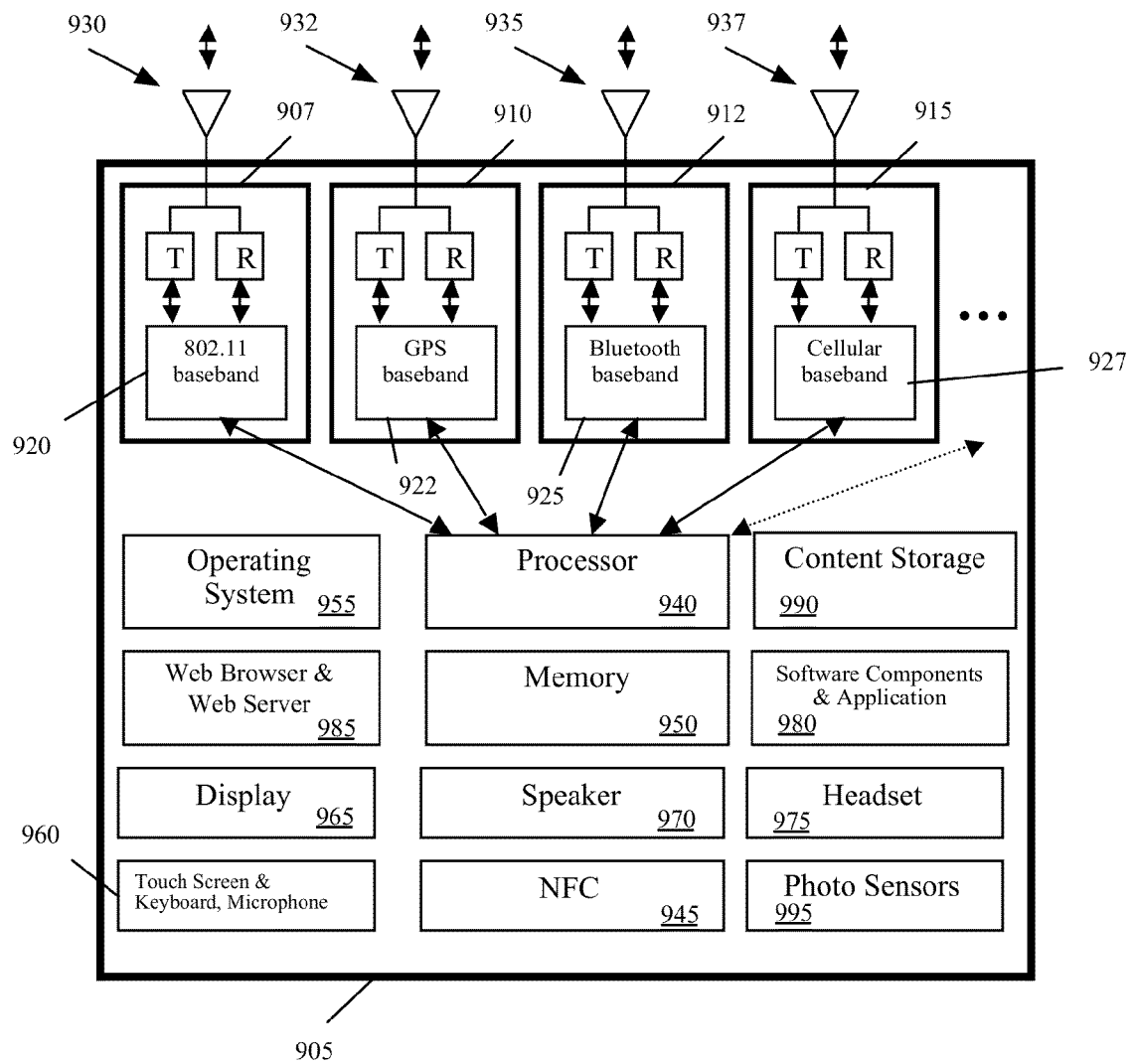
FIG. 9 conceptually illustrates some blocks of a cell phone in some embodiments of the invention.

FIG. 3 shows the basic blocks of a cell phone in some embodiments of the invention. FIG. 9 conceptually illustrates some of the other blocks of a cell phone in some embodiments of the invention. Some of these blocks are optional and are found in more advanced smart phones in some embodiments of the invention. The mobile device 905 in FIG. 9 includes one or more wireless radio devices 907-915 with antenna 930-937 that transmit and receive electromagnetic waves, and baseband transceivers 920-927 that process the information. Thus, in addition to the cellular radio of FIG. 3, the device has GPS 910, Bluetooth 912, and 802.11 (Wi-Fi) 907 radios. These radios in some embodiments share the same antenna. In other embodiments the radios use separate antennas 930-937. A processor 940 controls the radios. The device has NFC circuitry 945 for reading barcodes, smart cards, and interfacing with electronic payment systems. The memory 950 has read-only-memory (ROM) for program storage and random access memory (RAM) for running programs. The operating system 955 interfaces the hardware with the user and manages resources. Input devices 960 of the mobile device include keyboard and/or touch screen, microphone, and camera photo-sensors 995 for still pictures and video. Output devices include a display 965, speaker 970, and wired or wireless headsets 975. The mobile has a number of dedicated applications 980 such as email, instant messenger, chat, SMS, social networking, and camera. The mobile device also has a browser 985 that is used to browse information on the intranet/Internet and download other applications from the network. There is a bus (not shown) that links all these components with the processor and memory. A section 990 of the memory is dedicated to local storage of content such as pictures, video, audio, and email.

II. Other Embodiments of the Invention

Figure 1:
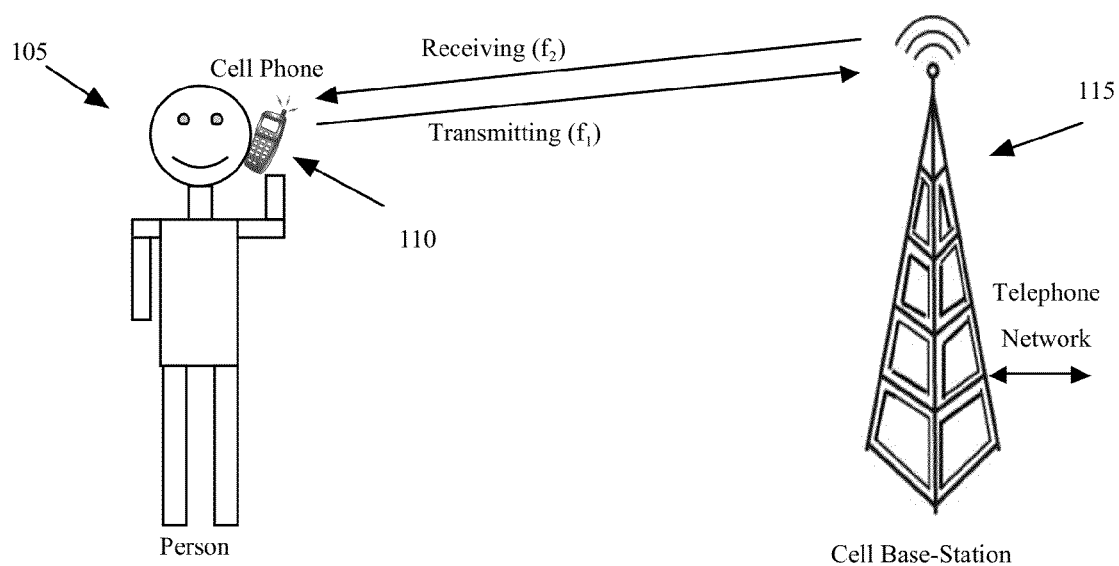
FIG. 1 illustrates a conventional cellular communication system according to prior art.

In some embodiments the cell phone changes its mode of operation from FIG. 1 to FIG. 2 when its battery power level reaches a pre-set threshold. The cell phone also acts as the master of the repeater for turning its power on and off as needed. Thus, the processor of the cell phone checks the battery level at regular intervals or before the cell phone is about to transmit. If the battery level is higher than the threshold the processor turns off the repeater power and adjusts the gain control of the cell phone's transmitter so it transmits with a higher power for direct phone to base-station communication. If the battery level is at or below the threshold the processor turns on the repeater power and adjusts the gain control of the cell phone's transmitter so it transmits at a lower power for phone to repeater to base-station communication. The mobile phone also receives control signals from the base-station and uses those to adjust the gain settings of its transmit amplifier.

Figure 10:
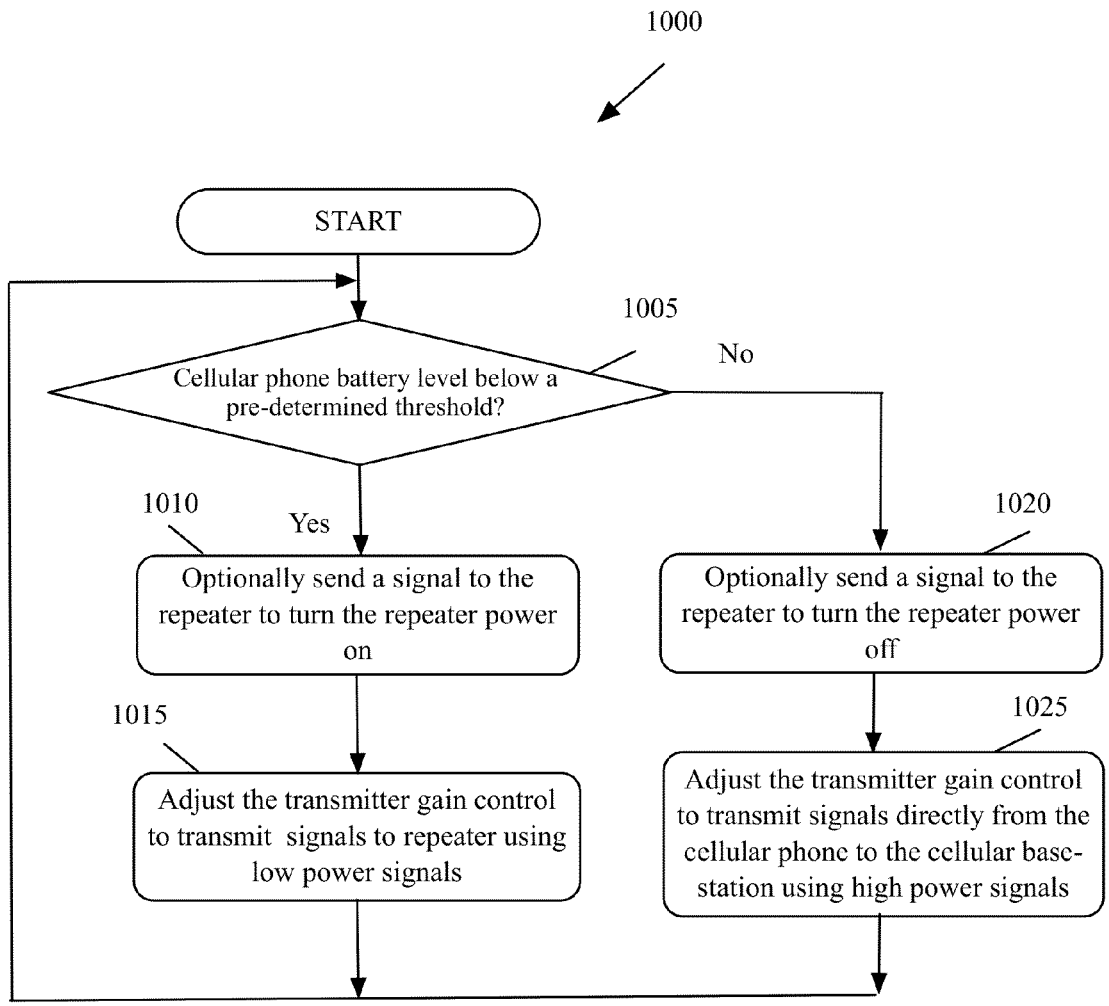
FIG. 10 conceptually illustrates a process for preserving a cellular phone battery by using a repeater to transmit signals to cellular base-stations in some embodiments of the invention.

FIG. 10 conceptually illustrates a process 1000 for preserving a cellular phone battery by using a repeater to transmit signals to cellular base-stations in some embodiments of the invention. As shown, the process determines (at 1005) whether the cellular phone battery level is below a pre-determined level (e.g., a default threshold or a threshold selected by the user). If not, the process proceeds to 1020, which is described below. Otherwise, the process optionally sends (at 1010) a signal to the repeater to turn the repeater power on. The process then adjusts the transmitter gain control to transmit (at 1015) any modulated RF signals to the repeater by using low power transmission signals. The process then proceeds to 1005, which was described above.

The process optionally sends (at 1020) a signal to the repeater to turn the repeater power off (or to put the repeater in hibernation where the power to at least a subset of the repeater components is turned off). The process then adjusts the transmitter gain control to transmit (at 1025) any modulated RF signals directly from the cellular phone to the base-station using high power signals. The process then proceeds to 1005, which was described above.

In an alternative embodiment, process 1000 also considers the battery level of the repeater. For instance, the process determines that the battery level of the repeater is above a predetermined threshold, before turning on (at 1010) the repeater and using (at 1015) low power signals to communicate with the repeater. As an example, the process in some embodiments (i) uses the repeater when the repeater battery is high, (ii) doesn't use the repeater when the repeater battery is low and cellular phone battery is high, and (iii) when the battery levels on both devices are below certain thresholds, extends the distributed battery life of the system by first using the repeater until the repeater battery is out (or is below a second threshold) and then using only the cellular phone. Other embodiments utilize other criteria to use the repeater (e.g., criteria set by the user through a text or graphical user interface or criteria set as default to use the repeater based on the repeater battery level, cellular phone battery level, location of the cellular phone, etc.).

The repeater discussed in FIG. 2 and FIG. 3 operates in the uplink direction. In some embodiments the repeater is bidirectional and is also used to amplify the signals from the base-station to the cell phone. Thus the repeater has two amplifiers, one for transmission to the base-station and one for transmission to the cell phone.

In some embodiments the repeater has other components, such as its own radio modem and most or all the physical layers to do demodulating, re-modulating, reformatting and coding for other standards. For example, the repeater in some embodiments reformats the signal it receives from the cell phone and sends it out in a packet-based format over Internet Protocol (IP) networks such as the Internet for IP telephony or Voice over IP (VoIP). In other embodiments the cell phone can function like a cordless phone and the repeater can act like the base of the cordless phone. In other embodiments the wireless communication between the cell phone and the repeater is microwave, laser, induction, optical or other electromagnetic frequencies and methods, where the components have different designs but provide the same functionality. For example, the antenna for electromagnetic and microwave systems are different in some embodiments.

In some embodiments, the communication between the cell phone and the repeater could be a wire-line mechanism such as a Universal Serial Bus (USB), PCI express, cable or transmission line. In these embodiments both the cell phone and the repeater have connection ports for wire-line connection. The cell phone and the repeater in some embodiments also use a control channel for synchronization of clocks, gain control, programming, calibration and changing of parameters. In some embodiments the cell phone sends its clock timing to the repeater, while in other embodiments the repeater has its own clock.

The cell phone of FIG. 3 and/or the repeater in some embodiments also have multiple antennas to support Multiple Input Multiple Output (MIMO) processing. The use of multiple antennas at the transmitter and/or the receiver can improve communication performance by increasing spectral efficiency. It can also reduce fading, provide diversity, and improve link range and reliability without requiring additional transmit power.

III. Electronic System

FIG. 11 conceptually illustrates an electronic system 1100 with which some embodiments of the invention are implemented. The electronic system 1100 may be a computer (e.g., a desktop computer, personal computer, tablet computer, server, etc.), phone, PDA, or any other sort of electronic or computing device. Such an electronic system includes various types of computer readable media and interfaces for various other types of computer readable media. Electronic system 1100 in some embodiments includes a bus 1105, processing unit(s) 1110, a system memory 1120, a network 1125, a read-only memory 1130, a permanent storage device 1135, input devices 1140, and output devices 1145.

The bus 1105 collectively represents all system, peripheral, and chipset buses that communicatively connect the numerous internal devices of the electronic system 1100. For instance, the bus 1105 communicatively connects the processing unit(s) 1110 with the read-only memory 1130, the system memory 1120, and the permanent storage device 1135.

From these various memory units, the processing unit(s) 1110 retrieves instructions to execute and data to process in order to execute the processes of the invention. The processing unit(s) may be a single processor or a multi-core processor in different embodiments.

The read-only-memory (ROM) 1130 stores static data and instructions that are needed by the processing unit(s) 1110 and other modules of the electronic system. The permanent storage device 1135, on the other hand, is a read-and-write memory device. This device is a non-volatile memory unit that stores instructions and data even when the electronic system 1100 is off. Some embodiments of the invention use a mass-storage device (such as a magnetic or optical disk and its corresponding disk drive) as the permanent storage device 1135.

Other embodiments use a removable storage device (such as a floppy disk, flash memory device, etc., and its corresponding disk drive) as the permanent storage device. Like the permanent storage device 1135, the system memory 1120 is a read-and-write memory device. However, unlike storage device 1135, the system memory 1120 is a volatile read-and-write memory, such a random access memory. The system memory 1120 stores some of the instructions and data that the processor needs at runtime. In some embodiments, the invention's processes are stored in the system memory 1120, the permanent storage device 1135, and/or the read-only memory 1130. For example, the various memory units include instructions for processing multimedia clips in accordance with some embodiments. From these various memory units, the processing unit(s) 1110 retrieves instructions to execute and data to process in order to execute the processes of some embodiments.

The bus 1105 also connects to the input and output devices 1140 and 1145. The input devices 1140 enable the user to communicate information and select commands to the electronic system. The input devices 1140 include alphanumeric keyboards and pointing devices (also called "cursor control devices"), cameras (e.g., webcams), microphones or similar devices for receiving voice commands, etc. The output devices 1145 display images generated by the electronic system or otherwise output data. The output devices 1145 include printers and display devices, such as cathode ray tubes (CRT) or liquid crystal displays (LCD), as well as speakers or similar audio output devices. Some embodiments include devices such as a touchscreen that function as both input and output devices.

Finally, as shown in FIG. 11, bus 1105 also couples electronic system 1100 to a network 1125 through a network adapter (not shown). In this manner, the computer can be a part of a network of computers (such as a local area network ("LAN"), a wide area network ("WAN"), or an Intranet, or a network of networks, such as the Internet. Any or all components of electronic system 1100 may be used in conjunction with the invention.

Many of the above-described features and applications are implemented as software processes that are specified as a set of instructions recorded on a computer readable storage medium (also referred to as computer readable medium, machine readable medium, machine readable storage). When these instructions are executed by one or more computational or processing unit(s) (e.g., one or more processors, cores of processors, or other processing units), they cause the processing unit(s) to perform the actions indicated in the instructions. Examples of computer readable media include, but are not limited to, CD-ROMs, flash drives, random access memory (RAM) chips, hard drives, erasable programmable read only memories (EPROMs), electrically erasable programmable read-only memories (EEPROMs), etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself. In addition, some embodiments execute software stored in programmable logic devices (PLDs), ROM, or RAM devices.

As used in this specification and any claims of this application, the terms "computer", "server", "processor", and "memory" all refer to electronic or other technological devices. These terms exclude people or groups of people. For the purposes of this specification, the terms display or displaying means displaying on an electronic device. As used in this specification and any claims of this application, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

While the invention has been described with reference to numerous specific details, one of ordinary skill in the art will recognize that the invention can be embodied in other specific forms without departing from the spirit of the invention. In addition, a number of the figures (e.g., FIGS. 4-6 and 10)

conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process. Thus, one of ordinary skill in the art would understand that the invention is not to be limited by the foregoing illustrative details, but rather is to be defined by the appended claims.

What is claimed is:

1. A communication system comprising:
   a mobile device; and
   a repeater;
   the mobile device comprising:
      a transmitter configured to:
         transmit low power short-range modulated signals to the repeater in lieu of directly sending said high power long-range modulated signals to the cellular base station, wherein the mobile device is configured to transmit said low power short-range modulated signals to the repeater at a first power level at least 10 times lower than a second power level required to transmit said high power long-range signals directly from the mobile device to the cellular based station; and
   the repeater comprising:
      a receive antenna configured to receive said low power short-range modulated signals from the mobile device;
      a power amplifier configured to amplify said low power short-range modulated signals received from the mobile device to said second power level;
      a transmit antenna configured to transmit high power long-range modulated signals at the second power level to the cellular base station; and
      an adjustable clip configured to attach to a person's body or clothing to maintain a predetermined minimum distance between the repeater and the person's body.

2. The communication system of claim 1, the repeater further comprising a power switch configured to turn on and off power to the repeater.

3. The communication system of claim 2, wherein the power switch is a manually operated switch.

4. The communication system of claim 2, wherein the mobile device is further configured to send signals to the repeater power switch to turn the repeater power on or off.

5. The communication system of claim 1, the repeater further comprising a power switch configured to turn on and off power to the repeater, wherein the power switch automatically turns power to the repeater on or off based on signals received from the mobile device to turn the repeater power on or off.

6. The communication system of claim 5, wherein the repeater further comprises a power-control tag and a set of logic circuits to control the power switch, wherein the mobile device is further configured to interrogate the power-control tag prior to transmitting signals to the repeater, wherein the power-control tag and the set of logic circuits are configured to generate a signal to turn the power switch on.

7. The communication system of claim 6, wherein the mobile device is further configured to send a control signal to the repeater to turn the power switch off.

8. The communication system of claim 6, wherein the power-control tag is one of a radio frequency identification (RFID) tag and a near field communication (NFC) tag.

9. The communication system of claim 1, wherein the repeater does not perform down-conversion or up-conversion on carrier frequencies of the received modulated signals.

10. The communication system of claim 1, wherein the repeater comprises a battery.

11. The communication system of claim 1, wherein the repeater comprises a connector to connect to an AC power source.

12. The communication system of claim 1, wherein the mobile device is a first mobile device, the communication system further comprising a second mobile device different than the first mobile device, wherein the repeater is integrated into the second mobile device.

13. The communication system of claim 12, wherein the second mobile device comprises a battery, wherein the second mobile device is one of a digital watch, a digital tablet, a laptop, a portable handheld computer, a game controller, a digital camera, a digital audio player, a pager, a laptop computer, and a personal digital assistant (PDA).

14. The communication system of claim 1, wherein the mobile device is a first electronic device, the communication system further comprising a second electronic device different than the first electronic device, wherein the repeater is integrated into the second mobile device, wherein the second electronic device utilizes an alternating current (AC) power source, wherein the second electronic device is one of a wireless access point, a router, a television, a cable and satellite set-top box, a personal computer (PC), a display monitor, a stereo system, a fax, a printer, a scanner, a hard disk, a flash drive, and a consumer electronic device.

15. The communication system of claim 1, wherein the mobile device is a first electronic device, the communication system further comprising a second electronic device different than the first electronic device, wherein the repeater is integrated into the second mobile device, wherein the second electronic device is a consumer electronic device.

16. The communication system of claim 1, wherein the mobile device is further configured to receive voice calls and data from the cellular base stations without using the repeater.

17. The communication system of claim 1, the mobile device further comprising:
   a battery; and
   a power amplifier configured to control transmission power of the mobile device and to send one of (i) said high power long-range signals to the cellular base station and (ii) said low power short-range signals to the repeater;
   the mobile device further configured to monitor a power level of the battery and switch from sending the high power signals to sending the low power signals when the power level of the battery is below a pre-determined threshold.

18. The communication system of claim 17, the repeater further comprising a battery, the mobile device further configured to monitor a power level of the repeater battery and switch from sending the high power signals to sending the low power signals based on (i) the power level of the repeater battery and (ii) the power level of the mobile device battery.

19. The communication system of claim 1, wherein the signals transmitted from the mobile device to the repeater further comprise at least one of voice and data, the mobile device further comprising a processor configured to determine whether voice, data, or both are transmitted from the mobile device to the repeater.

20. The communication system of claim 1, the mobile device further comprising a processor to determine whether to transmit said low power short-range signals to the repeater or to transmit said high power long-range signals to the cellular base station based on a quality of service requirement for the transmission to the cellular base station.

21. The communication system of claim 20, wherein the signals received and transmitted form the repeater comprise voice and data signals.

22. A method of communicating modulated radio frequency (RF) signals from a mobile device to a cellular base station using a repeater, the method comprising:
  transmitting the modulated RF signals from the mobile device to the repeater using low power short-range modulated signals, the repeater comprising an adjustable clip to attach to a person's body or clothing to maintain a predetermined minimum distance between the repeater and the person's body, the low power short-range modulated signals transmitted at a first power level at least 10 times lower than a second power level required to transmit high power long-range signals directly from the mobile device to the cellular based station;
  receiving the low power short-range modulated signals at the repeater;
  amplifying the received low power short-range modulated signals at the repeater to the second power level; and
  transmitting high power long-range modulated signals at the second power level from the repeater to the cellular base station.

23. The method of claim 22 further comprising:
  determining that the cellular base station has not received the high power long-range modulated signals from the repeater; and
  transmitting the modulated RF signals at the second power level directly from the mobile device to the cellular base station using said high power long-range signals.

24. The method of claim 23, wherein the mobile device comprises a transmitter gain control, wherein transmitting the modulated RF signals from the mobile device using high power long-range signals comprises adjusting the transmitter gain control to transmit signals with said second power level required to directly transmit signals from the mobile device to the cellular base station.

25. The method of claim 23 further comprising sending a control signal from the mobile device to the repeater to turn the repeater power off.

26. The method of claim 22, wherein the repeater does not up-convert or down-convert carrier frequencies of signals received from the mobile device.

27. The method of claim 22, wherein the repeater further comprises a power switch to turn on and off power to the repeater, the method further comprising sending a signal from the mobile device to the repeater to turn the repeater power on prior to transmitting the modulated RF signals from the mobile device using the low power short-range signals.

28. The method of claim 27, wherein the repeater further comprises a power-control tag, wherein sending a signal to turn the repeater power on comprises interrogating the power-control tag by the mobile device.

29. The method of claim 28, wherein the power-control tag generates a signal to turn the power switch on.

30. The method of claim 28, wherein the power-control tag is one of a radio frequency identification (RFID) tag and a near field communication (NFC) tag.

31. The method of claim 22, wherein the mobile device comprises a user interface, the method further comprising:
  receiving a set of criteria through the user interface to use the repeater,
  wherein transmitting the modulated RF signals from the mobile device using the low power short-range signals comprises determining whether a criteria in the set of criteria to use the repeater is met.

32. The method of claim 31 further comprising determining a location of the mobile device, wherein the set of criteria to use the repeater comprises a criteria to use the repeater based on the location of the mobile device.

33. The method of claim 31, wherein the set of criteria to use the repeater comprises a criteria to use the repeater at a certain time of a day or certain dates.

34. The method of claim 31, wherein the repeater is a repeater in a plurality of repeaters, each repeater in the plurality of repeaters comprising an identification, wherein the mobile device maintains a list of authorized repeaters, wherein the set of criteria to use the repeater comprises a criteria to only use repeaters in the list of authorized repeaters.

35. The method of claim 22, wherein the repeater further comprises a battery, the method further comprising:
  monitoring a power level of the repeater battery; and
  transmitting the modulated RF signals from the mobile device using the high power long-range signals when the power level of the repeater battery is below a threshold.

36. The method of claim 22, wherein the repeater and the mobile device each comprises a battery, the method further comprising:
  monitoring power levels of the repeater and the mobile device batteries; and
  determining whether to transmit said modulated RF signals from the mobile device using the low power short-range signals or the high power long-range signals based on the monitored power levels of the repeater and the mobile device batteries.

37. The method of claim 22 further comprising determining whether to transmit said modulated RF signals from the mobile device using the low power short-range signals or the high power long-range signals based on a quality of service required for transmitting signals to the cellular base station.

38. The method of claim 22 further comprising:
  receiving data that does not comprise voice at the mobile device; and
  converting the received data to modulated radio frequency (RF) signals comprising the data;
  transmitting the modulated RF signals comprising the data from the mobile device to the cellular base station phone using high power long-range signals.

39. The method of claim 22, wherein the mobile device is a first electronic device, wherein the repeater is integrated into a second electronic device different than the first electronic device.

40. The method of claim 22, wherein the mobile device is a first mobile device, wherein the repeater is integrated into a second mobile device different than the first mobile device.

41. The method of claim 40, wherein the repeater further comprises a radio modem, the method further comprising utilizing the repeater radio modem to convert the received modulated signals from a first communication standard to a second communication standard.

42. The method of claim 41, wherein converting the received modulated signals from a first communication standard to a second communication standard comprises demodulating, reformatting, coding, and re-modulating said received modulated signals.

43. The method of claim 22, wherein the low power short-range signals comprise a first wireless standard, wherein the high power long-range signals comprises a second standard different than the first standard.

44. The method of claim 22, wherein the mobile device is a cellular phone.

45. The communication system of claim 1, wherein the mobile device is a cellular phone.

46. The communication system of claim 12, wherein the repeater further comprises a radio modem configured to convert the received modulated signals from a first communication standard to a second communication standard.

47. The communication system of claim 46, wherein converting the received modulated signals from a first communication standard to a second communication standard comprises demodulating, reformatting, coding, and re-modulating said received modulated signals.

48. The communication system of claim 1, wherein the low power short-range signals comprise a first wireless standard, wherein the high power long-range signals comprises a second standard different than the first standard.

* * * * *